United States Patent Office 2,766,244
Patented Oct. 9, 1956

2,766,244

CONDITIONING OF VATTABLE QUINOIDIC COMPOUNDS

Robert E. Brouillard, Westfield, N. J., assignor to General Aniline & Film Corporation, New York, N. Y., a corporation of Delaware No Drawing. Application November 13, 1953,
Serial No. 392,029

14 Claims. (Cl. 260—272)

The present invention relates to a process for conditioning water-insoluble vattable quinoidic compounds, and more particularly, to an acid pasting procedure applied to such compounds which provides products whose particle size, particle size distribution, and particle surface characteristics render them exceedingly suitable for textile and other applications, as for example, dyeing, printing, padding, coloring of masses, and the like.

Water insoluble vattable organic dyestuffs are generally obtained as large coarse crystals or highly agglomerated amorphous masses. If these be applied without modification they possess very poor application properties and tinctorial values. It is therefore necessary in order to develop fully the coloristic potential and working properties of the dyestuffs, to so modify their nature that the particle characteristics are rigidly controlled.

Various methods have been developed for the conditioning of water insoluble vattable organic dyestuffs. The most important of these is that known as acid pasting. Such acid pasting may be accomplished by two general methods. The first method involves solution of the dyestuff in concentrated acid followed by precipitation of the dyestuff by drowning the acid solution into water. The second method involves slurrying the dyestuff in a large volume of acid having a concentration insufficient to effect appreciable solution, followed by diluting with water.

These two processes, although applicable to most water insoluble vattable organic dyestuffs suffer from disadvantages in that they require large quantities of acids which are generally of an extremely corrosive nature. In addition to this unfavorable economic and operational factor, the use of such volumes of acids requires correspondingly large pieces of equipment and poses problems in industrial hygiene and safety, as well as an extremely serious and costly disposal problem.

Further factors militating against the adoption of such procedures are that the quality of the products obtained varies from run to run and is often unsatisfactory for particular applications, and that the concentration of dyestuffs in the final presscake is low. Low presscake concentrations are disadvantageous in that they result in lower capacities, greater handling costs, and involve troublesome operations such as distillation or hydraulic pressing before marketable products can be obtained.

The above disadvantages have long been recognized and proposals have been made to overcome them by modifying the conventional acid pasting procedures. To this end it is suggested in U. S. Patent No. 2,334,812 to drown the acid solution of the dyestuff in water under conditions described as "turbulent flow." On the other hand, U. S. Patent No. 2,176,011 teaches the spraying of the acid solution into water.

While these modifications have led to improvements in specific properties, these improvements have been accompanied by degradation in other properties. More important still is the fact that these modifications have failed to eliminate the basic economic, quality, and handling problems inherent in the previous acid pasting procedures.

Suggestions have also been made with regard to the use of conditioning methods which avoid acid pasting. One such suggestion comprises the solution of a vattable dyestuff as the leuco compound and precipitation by oxidation. Another suggestion in U. S. Patent No. 2,402,167 describes the creation of small particles by grinding under suitable conditions. These procedures have serious operational disadvantages and involve high manufacturing costs. When this factor is added to the fact that the dyestuffs conditioned in this way show no advantage over those obtained by acid pasting, it is manifest that these conditioning methods have not met with full acceptance by the trade.

The purposes and objects of the present invention are constituted by the provision of an acid pasting method for conditioning water-insoluble vattable quinoidic compounds which yields products of optimum particle characteristics and high presscake concentrations while avoiding the unfavorable economic, hygiene, and safety factors of previous methods, as well as the extremely serious and costly disposal problems inherent in such methods. Other objects and advantages will appear as the description proceeds.

The above objects are attained by the instant invention which is directed to a process comprising milling with forces predominantly shearing in nature a mixture in the form of a doughy kneadable mass comprising a water-insoluble vattable quinoidic compound and from 0.5 to 4 parts by weight of the compound of a strong normally liquid, non-oxidizing and non-reactive acid having a concentration ranging from 68 to 100 percent, and then diluting the milled mixture with water. The aqueous mixture may then be filtered and washed acid free.

As strong non-oxidizing, non-reactive normally liquid acids which may be employed in the process of this invention, there may be mentioned sulfuric, phosphoric, chlorosulfonic, chloroacetic, and lower alkylsulfonic acids such as methyl sulfonic, ethyl sulfonic and the like. These acids will not react (i. e., oxidize, reduce, sulfonate, etc.) with the compound being milled under the conditions of the treatment herein contemplated. The greatest economy and best results are obtained with sulfuric acid and the use of this acid is therefore preferred. These acids are to be employed in concentrations ranging from 68 to 100 percent by weight. A simple test is all that is necessary to ascertain the specific concentration within this range which will give optimum results with the specific compound and compound to acid ratios employed in any particular instance.

One of the essential features of this process is the quantity of acid employed. Such quantity should be that necessary to produce with the compound being milled a doughy kneadable mass. Accordingly, the ratio of vattable quinoidic compound to acid will fall within the range of 1:0.5 to 1:4 by weight. Within this range, the particular quantity of acid which will produce a doughy kneadable mass could be readily determined by experimentation in any particular instance. If the quantity is too small, the water-insoluble vattable quinoidic compound does not wet out completely. In addition the shearing characteristics are not ideal. Too great a quantity of acid, on the other hand, does not allow adequate shearing and leads to lumpy masses in which the acid does not contact all of the particles of the compound.

The particular apparatus used for effecting the milling of the water-insoluble vattable quinoidic compound must be capable of exerting forces predominantly shearing in nature substantially uniformly throughout a mass having the proportions of compound to acid stated above. I prefer to use a Werner-Pfleiderer type of mill, but Banbury mixers and others of this general class, as well as mills capable of effecting shearing by means of extrusion may also be employed.

The temperature at which the process is carried out is not particularly critical so long as non-reactive conditions are maintained and may in fact vary between the melting point and the boiling point of the composition being milled, as for example, between about 0 to 150° C. There is a definite relationship between the temperature employed and the acid concentration required to give optimum results with a particular compound. Higher temperatures generally require lower acid concentrations. For practical reasons, I prefer to operate in the temperature range of about 20 to 50° C. since unjacketed equipment may thus be employed. The milling time under shear is also dependent on other factors and may range from as little as about 5 minutes to as much as 5 hours or more, the shorter periods being obviously preferred where possible.

The procedure of this invention is suitable for the conditioning of any water-insoluble vattable quinoidic compound. The term "vattable" is employed in its accepted sense, namely the ability of the compound to be vatted or solubilized with reducing agents such as hydrosulfurous acids or the salts thereof, caustic alkali and sodium hydrosulfite, sulfoxyl-compounds and the like, to its leuco form. The meaning of the term "quinoidic" is intended and is to be understood as being exclusive of compounds having an indigoid structure. These compounds treated in accordance with this invention may contain inert substituents which do not interfere with the attainment of applicant's desired results.

As examples of water-insoluble, vattable quinoidic dyestuffs which may be conditioned in accordance with the process of this invention, there may be mentioned:

(1) Acylamino anthraquinones such as

Algol Yellow WG (C. I. 1126), Helio Fast Yellow 6GL (C. I. 1127), Algol Pink R (C. I. 1128), Algol Scarlet G (C. I. 1129), Algol Violet B (C. I. 1130),
1,4-di-benzoylaminoanthraquinone,
1,5-di-benzoylaminoanthraquinone
Algol Yellow 3G (C. I. 1139),
1-(p-diphenoylamino)-anthraquinone [U. S. 2,277,527],
Acylaminoanthraquinones of U. S. Patent Nos. 2,143,717, 2,183,873, 2,190,751, 2,000,348 and 2,228,455 and the like.

(2) Anthanthrones and their substitution products, such as

Dichloroanthanthrones,
Dibromoanthanthrones,
Mixed chloro-bromoanthanthrones,
Dihydroxyanthanthrones,
Monocyano and dicyanoanthanthrones,
Monoaminoanthanthrones,
Mononitroanthanthrones,
Dianthronyl thioethers,
Dihalogenated-dianthronyl thioethers,
Alkoxylated anthanthrones,
Condensation products of halogenated anthanthrones and 1-aminoanthraquinone-2-aldehydes,
Condensation products of dihalogenated anthanthrones with 1-aminoanthraquinone on the one hand, and 4-aminoanthraquinone on the other hand,
Condensation products of anthanthrone with 1-naphthylamines or 1-aminoanthraquinones,
and the like.

Specific examples of vat dyestuffs within these categories are anthanthrone, dibromoanthanthrone, dichloroanthanthrone and the anthanthrones described in U. S. Patent Nos. 1,801,709, 1,803,757, 1,803,758, 1,805,912, 1,805,913, 1,820,019, 1,822,045, 1,835,396, 1,849,426, 1,876,972, 1,876,973, 1,877,315, 1,880,440, 1,897,427, 2,191,685, (see Examples 8 to 12 inclusive), 2,320,694, and the like.

(3) Anthraquinone acridones such as

Benzo [b] naphth [2,3-h] acridine-5,8,16 (15 H)-trione
6,10,12-trichloronaphth [2,3-c] acridine-5,8,14 (13 H)-trione,
Dinaphth [2,3-c,2',3'-h] acridine-5,9,14,15,18 (6H)-pentone,
Dinaphth [2,3-c,2',3'-h] acridine-5,8,11,16,18 (17 H)-pentone,
6-aminonaphth [2,3-c] acridine-5,8,14 (13 H)-trione,
6-benzamidonaphth [2,3-c] acridine-5,8,14 (13 H)-trione,
6-analinonaphth [2,3-c] acridine-5,8,14 (13 H)-trione,
6-(1-naphthylamino) naphth [2,3-c] acridine-5,8,14 (13 H)-trions,
6-(2-naphthylamino) naphth [2,3-c] acridine-5,8,14 (13 H)-trione,
5-(1-anthraquinonylamino) naphth [2,3-c] acridine-5,8,14 (13 H)-trione,
6-(2-anthraquinonylamino) naphth [2,3-c] acridine-5,8,14 (13 H)-trione,
10-chloronaphth [2,3-c] acridine-5,8,14 (13 H)-trione,
10,12-dibromonaphth [2,3-c] acridine-5,8,14 (13 H)-trione,
10,12-dibromo-11-chloronaphth [2,3-c] acridine-5,8,14 (13 H)-trione,
11-chloronaphth [2,3-c] acridine-5,8,14 (13 H)-trione,
10-methoxynaphth [2,3-c] acridine-5,8,14 (13 H)-trione,
9-methoxynaphth [2,3-c] acridine-5,8,14 (13 H)-trione,
6-methylnaphth [2,3-c] acridine-5,8,14 (13 H)-trione,
10-methylnaphth [2,3-c] acridine-5,8,14 (13 H)-trione,
Benzo [b] naphth [2,3-h] acridine-5,8,16 (15 H)-trione,
10,10'-methylene bis (naphth [2,3-c] acridine-5,8,14 (13 H)-trione)
Naphth [2,3-b] acridine-7,12,14 (5 H)-trione,
Benzo [a] naphth [2,3-i] acridine-9,14,16 (7 H)-trione, The anthraquinone acridones described in U. S. Patent Nos. 1,709,993, 1,781,238, 1,785,801, 1,804,538, 1,833,770, 1,837,649, 1,840,383, 1,848,073, 1,848,074, 1,850,482, 1,851,082, 1,851,085, 1,855,295, 1,857,232, 2,180,419, 2,185,140, 2,204,232, 2,238,209, 2,242,411, 2,267,139,
and the like.

(4) Anthraquinone azines, such as

Indanthrene Blue R and RS (C. I. 1106),
Indanthrene Blue 3G (C. I. 1109),
Indanthrene Blue 5G (C. I. 1111),
Indanthrene Blue GCD (C. I. 1113),
Indanthrene Blue GC (C. I. 1115),
Indanthrene Green BB (C. I. 1116),
N,N8-dimethyl-1,2,1',2'-anthraquinone azine and the anthraquinone azines described in U. S. Patent Nos. 1,877,146, 1,877,946, and the like.

(5) Anthraquinone oxazoles, such as 1-amino-2-anthraquinoyl-2',3'-anthraquinone oxazole,
1 - amino-2-anthraquinoyl-α-mono-chloro-2',3'-anthraquinone oxazole,
1 - amino-2-anthraquinonyl-4'-ethoxy-2',3'-anthraquinone oxazole,
4-aminoanthraquinone-1,2-(N)-phenyl oxazole,
Anthraquinone-1,2'-isoxazole and its 5 nitro derivative,
Anthraquinone 1,2,5,6-di-isoxazole,
1,4 - diamino-2-anthraquinonyl-2',3'-anthraquinone oxazole,
1 - amino - 4 - nitro-2-anthraquinonyl-2',3'-anthraquinone oxazole, The anthraquinone oxazoles disclosed in United States Letters Patent Nos. 1,822,972, 2,123,834, 2,147,569, 2,147,570, 2,168,174, 2,174,072, 2,175,803, 2,206,127, 2,206,128, 2,244,655, 2,245,520, and the like.

(6) Anthraquinone thiazoles, such as

C-methyl-2,1-anthraquinone thiazole,
C-phenyl-2,1-anthraquinone thiazole,
4-benzoylamino-C-phenyl-2-1-anthraquinone thiazole,
C-phenyl-1,2-anthraquinone thiazole,
4'-dimethylamino-C-phenyl-1,2-anthraquinone thiazole,
6-amino-C-phenylanthraquinone-1,2-thiazole,
1,2,5,6-anthraquinone-C-diphenyldithiazole,
1,2,8,7-anthraquinone-C-diphenyldithiazole, 1,2,5,6 - anthraquinone-C-di -(2',4'-dichlorphenyl)-dithiazole,
1,2,5,6-anthraquinone-C-di-(4'-dimethylaminophenyl)- dithiazole,
The dithiazole described in U. S. 1,126,475, and its 3,3'-dibromo and 3,3'-dimethyl derivatives,
3,4,3',4'-benzidine-C-di -(β - anthraquinonyl) - dithiazole, and the like.

(7) Dibenzanthrones (including isodibenzanthrones), and their nitro-, halogenated-, amino-, and alkoxylated derivatives such as Indanthrene Green B (C. I. 1102), Indanthrene Violet RT (C. I. 1100), Indanthrene Dark Blue BO (C. I. 1099), Indanthrene Violet R (C. I. 1103), Indanthrene Brilliant Green B (C. I. 1101), the halogenated dibenzanthrones described in U. S. Patent Nos. 1,003,268, 1,589,303, 1,791,215, 1,925,410, 1,982,312, 1,982,313, and 2,232,700, the amino derivatives described in U. S. Patent Nos. 1,742,317, and 2,107,656, the amides described in U. S. Patent Nos. 1,856,203, 1,895,101 and 1,994,136, dimethoxydibenzanthrone (Jade Green), dinaphthdibenzanthrone, and the like.

(8) Anthraquinone carbazoles, such as 4-acetylamino-4'-methyl-1,2-anthraquinone carbazole,
4-acetylamino-2'-bromo-4'-methyl-1,2-anthraquinone carbazole,
5-benzoylamino-4'-methyl-1,2-anthraquinone carbazole,
4-m-bromobenzoylamino-4'-methyl - 1,2 - anthraquinone carbazole,
2,3,2',3'-dianthraquinone carbazole and its N-methyl-, N-ethyl-, and N-benzyl derivatives,
1,2,1',2'-dianthraquinone carbazole,
1,2,4,3-bis-1,2-anthraquinone carbazole,
1,2,5,6-bis-1,2-anthraquinone carbazole,
1,2,8,7-bis-1,2-anthraquinone carbazole,
The anthraquinone carbazoles described in U. S. Patent Nos. 2,140,873, 2,149,064, 2,176,430, and 2,212,965, and the anthraquinone carbazoles of Examples 1, 2, 4 and 7 of U. S. 2,270,168,
Phthaloyl-3-acetylamino-N-ethyl carbazole,
Phthaloyl-2-amino-N-ethyl carbazole (see U. S. 2,281,583),
4,4'-dibenzoylamino-1,1'-dianthrimide carbazole,
4,5-dibenzoylamino-1,1'-dianthrimide carbazole,
5,5'-dibenzoylamino-1,1'dianthrimide carbazole,
1,1'-5',1''-trianthrimide-2,2',6',2''-dicarbazole, and the like.

(9) Dipyrazolanthrone and its halogenated, nitro, alkyl, and cycloalkyl derivatives, i. e., Dichlorodipyrazolanthrone,
Dibromodipyrazolanthrone,
Dichloro-N,N'-dimethyldipyrazolanthrone,
Dichloro-N,N'-diethyldipyrazolanthrone,
Nitrodipyrazolanthrone,
Nitro-N,N'-dimethyldipyrazolanthrone,
N,N'-dimethyldipyrazolanthrone,
N,N'-diethyldipyrazolanthrone,
N-cyclohexyl-N'-methyldipyrazolanthrone,
N-cyclohexyl-N'-ethyldipyrazolanthrone,
N-monocyclohexyldipyrazolanthrone, and
The products described in U. S. 1,804,531, and the like.

(10) Polynuclear peri-di-and tetracarboxylic acid imides and imidazoles, i. e. vat dyestuffs containing one of the radicals

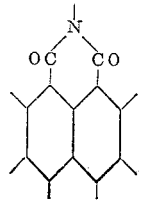

or

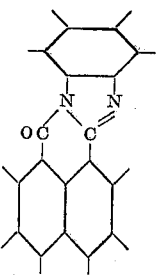

such as

Naphthoylene-(1,8,4,5)bis-benzimidazoles,
Perylene-3,4,9,10-tetracarboxylic acid bis-alkylimides, i. e.:
    Perylene-3,4,9,10-tetracarboxylic acid - bis - methylimide,
    Perylene-3,4,9,10-tetracarboxylic acid bis-ethylimide,
    Perylene-3,4,9,10-tetracarboxylic acid bis-butylimide,
    Perylene-3,4,9,10-tetracarboxylic acid bis-octylimide, and the like,
Perylene-3,4,9,10-tetracarboxylic acid bis-arylimides, i. e.:
    Perylene-3,4,9,10-tetracarboxylic acid bis-p-anisidide,
    Perylene-3,4,9,10-tetracarboxylic acid bis-anilide,
    Perylene-3,4,9,10-tetracarboxylic acid bis-p-chloranilide,
    Perylene-3,4,9,10-tetracarboxylic acid bis-p-toluidide,
    Perylene-3,4,9,10-tetracarboxylic acid bis-o-anisidide,
The heterocyclic imides and imidazoles disclosed in U. S. Patent Nos. 1,808,260, 1,819,082, 1,836,529, 1,847,561, 1,856,711, 1,847,584, 1,878,986, 1,888,625, 1,889,279, 1,910,465, 1,918,461, 1,924,090, 1,928,719, 1,935,945, 1,952,661, 2,231,495, 2,543,747, and the like;

(11) Flavanthrone and the substitution products thereof such as its halogenated and N-alkylated derivatives, i. e., N,N-dimethyl flavanthrone,
6,14-dibromoflavanthrone,
6,14-dichloroflavanthrone, and the like;

(12) Pyranthrone (C. I. 1096) and its halogen, nitro, amino, alkyl, cyano, alkoxy, aralkoxy, aryloxy and aroyl derivatives, i. e., Chloropyranthrone (C. I. 1097),
Bromopyranthrone (C. I. 1098),
Iodopyranthrone (U. S. 1,863,987),
Highly halogenated pyranthrones containing more than 4 halogen atoms (U. S. 1,876,975), dimethylpyranthrone (U. S. 2,023,926), nitropyranthrone (U. S. 1,077,115), mono to tetra aminopyranthrones (U. S. 1,863,987), methoxy and ethoxy pyranthrones (U. S. 1,863,987), dimethoxypyranthrone (U. S. 1,906,231), dibenzoylpyranthrone (U. S. 1,906,231), and the like.

(13) Pyrenequinones, such as 3,4,8,9-dibenzpyrenequinone-5,10,
4,5,8,9-dibenzpyrenequinone-3,10,
Benzo-naphtho-pyrenequinone,
Benzo-acenaphtho-pyrenequinone,
Mono and polynitro derivatives of 3,4,8,9-dibenzopyrene-5,10-quinone (U. S. 1,804,880),
The amino 3,4,8,9-dibenzopyrene-5,10-quinones described in U. S. 1,892,242,
The alkoxy derivatives of 3,4,8,9-dibenzpyrene-5,10-quinone described in U. S. 1,892,242,
The halogenated dibenzpyrenequinones described in U. S. Patent Nos. 1,804,880, 1,922,481, 1,901,307, 1,922,482, 1,855,293, 1,935,720, 1,942,761, 1,952,677, 1,957,892, 1,959,679 and 1,988,205,
The alkoxy derivatives of 3,4,8,9-dibenzpyrenequinones described in U. S. 1,932,591 and 2,124,891,
The nitro and amino derivatives of 3,4,8,9-dibenzpyrenequinone described in U. S. 1,876,966, and The amino and amide derivatives described in U. S. 1,863,662.

(14) Anthraquinone thioxanthones, such as 1,2'-anthraquinone thioxanthone,
4-amino-1,2-anthraquinone thioxanthone,
4-acylamino-1,2-anthraquinone thioxanthone,
4-benzoylamino-1,2-anthraquinone thioxanthone,
2' - chloro - 4 - benzoylamino - 1,2 - anthraquinone thioxanthone,
β - anthraquinonyl - 4 - amino - 1,2 - anthraquinone thioxanthone,
5' - chloro - 1,2 -anthraquinone thioxanthone,
4' - chloro - 1,2 - anthraquinone thioxanthone,
2',5' - dichloro - 1,2 -anthraquinone thioxanthone,
3',4' - dichloro - 1,2 - anthraquinone thioxanthone,
3',5'-dichloro-1,2-anthraquinone thioxanthone,
5' - methyl - 1,2 - anthraquinone thioxanthone,
5' - methyl - 4 -chloro - 1,2 - anthraquinone thioxanthone,
5'-methyl-4-phenylamino-1,2-anthraquinone thioxanthone,
Trianthraquinone-dithiooxanthone (German Patent No. 269,800),
1,2,5,6 - dianthraquinone thioxanthone,
1,2,5,6-anthraquinone dithioxanthone.

The vat dyes of U. S. Patent Nos. 2,428,758, 2,428,759, 2,495,914, 2,533,170, and the like.

It is to be emphasized that ball mills and similar apparatus operating by agitation, impact, and the like, are not suitable for producing applicant's desired results. In this connection, reference may be made to U. S. Patent No. 1,145,934 to Steindorff et al. disclosing the conditioning of anthraquinone azines with as little as five times its weight of sulfuric acid. The only milling or grinding process disclosed in the patent is in Example V wherein a mixture of 100 parts of dyestuff and 1400 parts of acid are ground in a ball mill. It has been found that the process of this example yields after filtration of the milled and drowned mixture, a presscake having a solids content of about 24.6 per cent by weight. This low presscake concentration is typical of prior art methods of conditioning and is of course unsatisfactory for practical commercial purposes. On the other hand, the process of this invention yields presscakes having solids contents of up to 60 per cent, the particles in the presscake being of such size, size distribution and surface characteristics as to render them exceedingly suitable for standardizing for textile operations and the like.

The examples in the following table, in which parts are by weight unless otherwise indicated, are illustrative of the instant invention and are not to be regarded as limitative. In each of these examples, the dyestuff and sulfuric acid were introduced at room temperature into a Werner-Pfleiderer mill with agitation. The mass was then milled for the stated duration after which it was diluted by discharging into the stated amount of water under vigorous agitation. The slurry which resulted was then filtered and the presscake washed acid free. In every instance, the presscake had a high solids content within a range of from 40 to 60 per cent by weight, and was readily standardized to produce a dyestuff composition having excellent application properties. It will be readily understood that the dilution of the milled mixture with water may alternatively be carried out by adding water and/or ice to the milled mixture instead of discharging the milled mixture into water and/or ice.

| Ex. | 100 parts Dyestuff | Sulfuric | | Minutes Duration | Parts Drowning Water |
|---|---|---|---|---|---|
| | | Parts | Percent Conc. | | |
| 1 | Algol Yellow WG | 200 | 80 | 15 | 2,000 |
| 2 | Algol Pink R | 150 | 96 | 30 | 1,500 |
| 3 | Algol Violet B | 300 | 96 | 10 | 3,000 |
| 4* | 1,4'-di-benzoylaminoanthraquinone | 100 | 85 | 30 | 3,000 |
| 5 | dichloranthanthrone | 150 | 100 | 60 | 1,500 |
| 6 | dibromoanthanthrone | 300 | 80 | 60 | 1,500 |
| 7 | anthanthrone | 150 | 100 | 60 | 1,500 |
| 8 | condensation product of anthanthrone and 1-amino-anthraquinone (Ex. 6 U. S. 2,191,685). | 300 | 80 | 60 | 1,500 |
| 9 | 2,7-dimethoxyanthanthrone | 150 | 100 | 60 | 1,500 |
| 10 | benzo[b] naphth [2,3-h]acridine-5, 8, 16 (15 H)-trione. | 200 | 100 | 30 | 2,000 |
| 11 | 10,12-dibromonaphth [2,3-c] acridine-5, 8, 14 (13 H)-trione. | 200 | 100 | 30 | 2,000 |
| 12 | 6, 10, 12-trichloronaphth [2, 3-c] acridine-5, 8, 14 (13 H)-trione. | 200 | 100 | 30 | 2,000 |
| 13 | 10, 12-dibromo-11-chlornaphth [2, 3-c]-5, 8, 14 (13 H)-trione. | 200 | 100 | 30 | 2,000 |
| 14 | benzo [1, 2-c, 4, 5-c'] diacridine-6, 9, 15, 18 (5H, 14H)-tetrone. | 100 | 96 | 60 | 1,000 |
| 15 | ----do---- | 100 | 80 | 60 | 1,000 |
| 16 | product of Example 2, U. S. 2,267,139 | 100 | 96 | 60 | 1,000 |
| 17 | Indanthrene Blue R | 150 | 100 | 60 | 1,500 |
| 18 | ----do---- | 300 | 80 | 60 | 1,500 |
| 19 | Indanthrene Blue GCD | 250 | 96 | 30 | 2,500 |
| 20 | Indanthrene Blue 5G | 250 | 96 | 30 | 2,500 |
| 21 | Indanthrene Green BB | 250 | 96 | 30 | 2,500 |
| 22 | 1-amino-2-anthraquinonyl-2',3'-anthraquinone oxazole. | 100 | 96 | 60 | 1,000 |
| 23 | 1-amino-2-anthraquinonyl-4'-ethoxy-2,3'-anthraquinone oxazole. | 300 | 80 | 60 | 3,000 |
| 24 | 4-aminoanthraquinone-1,2-(N)-phenyl oxazole | 100 | 80 | 60 | 1,000 |
| 25 | product of Example 3, U. S. 2,244,655 | 100 | 96 | 60 | 1,000 |
| 26 | product of Example 9, U. S. 2,206,128 | 100 | 96 | 60 | 1,000 |
| 27 | product of Example 1, U. S. 2,174,072 | 300 | 80 | 60 | 3,000 |
| 28 | 1,2,5,6-anthraquinone-C-diphenyl dithiazole | 130 | 100 | 30 | 1,300 |
| 29 | ----do---- | 300 | 70 | 30 | 1,300 |
| 30 | 3,4,3',4'-benzidine-C-di(β-anthraquinonyl)-dithiazole. | 200 | 96 | 60 | 2,000 |
| 31 | 1,2,5,6-anthraquinone-C-di(2',4'-dichlorphenyl)-dithiazole. | 130 | 100 | 30 | 1,300 |
| 32 | Indanthrene Dark Blue BO | 150 | 100 | 30 | 1,500 |
| 33 | Indanthrene Violet RT | 150 | 100 | 30 | 1,500 |
| 34 | Indanthrene Green B | 150 | 100 | 30 | 1,500 |
| 35 | Indanthrene Violet R | 200 | 96 | 60 | 2,000 |
| 36 | Indanthrene Brilliant Green B | 200 | 96 | 60 | 2,000 |
| 37 | Indanthrene Green B | 200 | 96 | 60 | 2,000 |
| 38 | diaminodibenzanthrone (U. S. 1,742,317) | 150 | 100 | 30 | 1,500 |
| 39 | 4,4'-dibenzoylamino-1,1'-dianthrimidecarbazole. | 150 | 100 | 15 | 1,500 |
| 40 | 4,5'-dibenzoylamino-1,1'-dianthrimidecarbazole. | 150 | 100 | 15 | 1,500 |

| Ex. | 100 parts Dyestuff | Sulfuric | | Minutes Duration | Parts Drowning Water |
|---|---|---|---|---|---|
| | | Parts | Percent Conc. | | |
| 41 | 5,5'-dibenzoylamino-1,1'-dianthrimidecarbazole. | 150 | 100 | 15 | 1,500 |
| 42 | 1,1',5'1''-trianthrimide-2,2'-6',2''-dicarbazole. | 300 | 80 | 60 | 3,000 |
| 43 | 1,2,1',2'-dianthraquinone carbazole | 150 | 100 | 15 | 1,500 |
| 44 | N,N'-dimethyldipyrazolanthrone | 150 | 96 | 30 | 2,000 |
| 45 | N,N'-diethyldipyrazolanthrone | 150 | 96 | 30 | 2,000 |
| 46 | naphthoylene (1,8,4,5)bis-benzimidazole | 200 | 96 | 30 | 2,000 |
| 47 | do | 300 | 80 | 30 | 2,000 |
| 48 | perylene-3,4,9,10-tetracarboxylic acid bis-p-anisidide. | 150 | 100 | 15 | 1,500 |
| 49 | perylene-3,4,9,10-tetracarboxylic bis-p-methylimide. | 150 | 100 | 15 | 1,500 |
| 50 | product of Ex. 2, U. S. 2,543,747 | 200 | 96 | 30 | 2,000 |
| 51 | flavanthrone | 150 | 100 | 30 | 1,500 |
| 52 | 6,14-dibromoflavanthrone | 300 | 80 | 30 | 1,500 |
| 53 | pyranthrone | 150 | 100 | 30 | 2,000 |
| 54 | do | 300 | 80 | 30 | 2,000 |
| 55 | chloropyranthrone | 100 | 96 | 60 | 1,000 |
| 56 | bromopyranthrone | 100 | 96 | 60 | 1,000 |
| 57 | dimethyl derivative of Ex. 4, U. S. 2,023,926 | 150 | 100 | 30 | 2,000 |
| 58 | 3,4,8,9-dibenzpyrenequinone-5,10 | 200 | 100 | 60 | 2,000 |
| 59 | 3,4,8,9-dibenzpyrenequinone-5,10, dichloro derivative (U. S. 1,959,679). | 200 | 100 | 60 | 2,000 |
| 60 | 3,4,8,9-dibenzpyrenequinone-5,10, dibromo derivative (U. S. 1,952, 677). | 200 | 100 | 60 | 2,000 |
| 61 | 3,4,8,9-dibenzpyrenequinone-5,10 | 300 | 80 | 30 | 3,000 |
| 62 | 3,4'-dichloro-1,2-anthraquinone thioxanthone | 100 | 96 | 60 | 2,000 |
| 63 | do | 250 | 80 | 60 | 2,000 |
| 64 | product of Ex. 1, U. S. 2,428,758 | 150 | 100 | 30 | 2,000 |
| 65 | product of Ex. 1, U. S. 2,533,170 | 100 | 96 | 60 | 2,000 |
| 66 | Indanthrene Dark Blue BO | 50 | 100 | 30 | 1,000 |

*In this example, 200 parts of 96% sulfuric acid were slowly added to the milled mass just prior to drowning.

This application is a continuation-in-part of applications Serial No. 269,689, filed February 2, 1952; Serial No. 269,690, filed February 2, 1952; Serial No. 279,941, filed April 1, 1952; Serial No. 272,689, filed February 20, 1952; Serial No. 269,617, filed February 1, 1952; Serial No. 253,212, filed October 25, 1951; Serial No. 254,636, filed November 2, 1951; Serial No. 253,990, filed October 30, 1951; Serial No. 236,695, filed July 13, 1951; Serial No. 272,690, filed February 20, 1952; Serial No. 236,696, filed July 13, 1951; Serial No. 236,697, filed July 13, 1951; Serial No. 237,487, filed July 18, 1951, and Serial No. 254,813, filed November 3, 1951, all now abandoned.

Various modifications and variations of this invention will be obvious to persons skilled in the art and it is to be understood that such modifications and variations are to be included within the purview of this application and the spirit and scope of the appended claims.

I claim:

1. A process comprising milling, by kneading, with forces predominantly shearing in nature a mixture in the form of a doughy, kneadable mass comprising a water-insoluble vattable quinoidic compound and from 0.5 to 4 parts by weight of the compound of a strong normally liquid non-oxidizing, non-reactive acid having a concentration ranging from 68 to 100 per cent by weight, and then diluting the milled mixture with water.

2. A process as described in claim 1 in which the acid is selected from the group consisting of sulfuric, chloroacetic, phosphoric, chlorosulfonic, and lower alkyl sulfonic acids.

3. A process as defined in claim 2 wherein the acid is sulfuric acid.

4. A process as defined in claim 1 wherein said quinoidic compound is selected from the group consisting of acylamino anthraquinones, anthanthrones, anthraquinone acridones, anthraquinone azines, anthraquinone oxazoles, anthraquinone thiazoles, dibenzanthrones, anthraquinone carbazoles, dipyrazolanthrones, polynuclear peridi- and tetracarboxylic acid imides and imidazoles, flavanthrones, pyranthrones, pyrenequinones, and anthraquinone thioxanthones.

5. A process as defined in claim 1 wherein said quinoidic compound in an acylamino anthraquinone and said acid is sulfuric acid.

6. A process as defined in claim 5 wherein the acylamino anthraquinone is Algol Yellow WG, the ratio of dyestuff to acid is 1:2 and the concentration of acid is 80 per cent.

7. A process as defined in claim 1 wherein said quinoidic compound is an anthraquinone acridone and said acid is sulfuric acid.

8. A process as defined in claim 7 wherein said anthraquinone acridone is benzo[1,2-c,4,5-c']diacridine-6,9,15,-18-(5H,14H)-tetrone, the ratio of dyestuff to acid is 1:1 and the concentration of acid is 96 per cent.

9. A process as defined in claim 1 wherein said quinoidic compound is an anthraquinone thiazole and said acid is sulfuric acid.

10. A process as defined in claim 9 wherein said anthraquinone thiazole is 1,2,5,6-anthraquinone-C-diphenyl-dithiazole, the ratio of dyestuff to acid is 1:3 and the concentration of acid is 70 per cent.

11. A process as defined in claim 1 wherein said quinoidic compound is a dibenzanthrone and said acid is sulfuric acid.

12. A process as defined in claim 11 wherein said dibenzanthrone is Indanthrene Dark Blue BO, the ratio of dyestuff to acid is 1:1.5 and the acid concentration is 100 per cent.

13. A process as defined in claim 1 wherein said quinoidic compound is an anthraquinone carbazole and said acid is sulfuric acid.

14. A process as defined in claim 13 wherein said anthraquinone carbazole is 4,4' - dibenzoylamino - 1,1' - dianthrimide carbazole, the ratio of dyestuff to acid is 1:1.5 and the acid concentration is 100 per cent.

References Cited in the file of this patent

UNITED STATES PATENTS

| | | |
|---|---|---|
| 1,145,934 | Steindorff et al. | July 13, 1915 |
| 2,402,167 | Lang | June 18, 1946 |

OTHER REFERENCES

Mattiello: "Protective and Decorative Coatings," pp. 82–83, vol. 4, Wiley and Sons (1944).